United States Patent [19]

Röhner et al.

[11] Patent Number: 4,678,203
[45] Date of Patent: Jul. 7, 1987

[54] AIR SPRING

[75] Inventors: Gerhard Röhner, Mannheim; Willi Schweikert, Heidelberg; Gerd-Heinz Ticks, Wald-Michelbach, all of Fed. Rep. of Germany

[73] Assignee: Firma Carl Freudenberg, Weinheim, Fed. Rep. of Germany

[21] Appl. No.: 773,415

[22] Filed: Sep. 6, 1985

[30] Foreign Application Priority Data

Sep. 21, 1984 [DE] Fed. Rep. of Germany ....... 3434660

[51] Int. Cl.$^4$ .............................................. B60G 11/26
[52] U.S. Cl. ................................. 280/707; 267/64.21; 267/64.28
[58] Field of Search ............... 280/703, 707, 702, 711; 267/64.21, 64.28

[56] References Cited

U.S. PATENT DOCUMENTS 4,310,172  1/1982  Claude et al. ................. 280/707
4,386,791  6/1983  Watanabe ...................... 280/707

Primary Examiner—Richard A. Bertsch
Attorney, Agent, or Firm—Felfe & Lynch

[57] ABSTRACT

An air spring has a variable interior space at a gas pressure for spring action between relatively-vibrating bodies. A control device has a sensor electrically responsive to the gas pressure for electrically operating an intake valve for admitting gas to the interior space and an outlet valve for venting gas from the interior space to atmosphere. This damps or isolates vibrations in the air spring in dependence on the control device. The control device may also respond to auxiliary transducers for the gas pressure, spring height, and level, speed, steering, braking, or acceleration of a vehicle on which the air spring is used, for example.

20 Claims, 4 Drawing Figures

AIR SPRING

BACKGROUND OF THE INVENTION

The invention relates to an air spring.

A known air spring for use between relatively-vibrating bodies has a variable interior space filled with air at a mean pressure for spring action between the bodies, connected to a compressed-gas reservoir through a supply line having an intake valve, and provided with an outlet valve. A control device detects the pressure in the variable interior space, opens the outlet valve when the pressure rises above the mean pressure, and opens the intake valve when the pressure drops below the mean pressure to compensate for vibration-produced pressure variations in the interior space.

For example, German patent publication DAS No. 12 82 475 discloses a pneumatically-damped air-suspension system in which a double-acting valve connects the variable interior space of an air spring to an equalizing space. The valve is actuated by vibration-induced pressure differentials between the interior space of the air spring and the equalizing space to provide some compensation for the over- or under-pressures in the air spring producing the pressure differentials. However, the damping action so obtained is not fully satisfactory because the pressure compensation in the air spring to counteract vibration-induced pressure differentials is actually confined within very narrow limits by essentially-identical mean pressures in the equalizing space and the interior space of the air spring. This basic situation remains the same even if the valve is connected to a separate damper. The isolating action therefore falls short of satisfying stringent requirements, except in rare cases.

SUMMARY OF THE INVENTION

An object of the invention is, therefore, to improve an air spring of the type described above to obtain better isolation of high-frequency vibrations than with a passive air spring, and better damping of vibrations in the resonance region than with known actively-compensated air springs.

Another object of the invention is to permit the spring characteristics of an air spring to be selectively modified, for example for adapting it to predictable peculiarities resulting from its use in a motor vehicle.

To these and other ends, the invention provides an air spring of the type described above in which a control device which responds to the pressure in a variable interior space of the air spring for spring action has an electric sensor and a drive for actuating a compressed-gas intake valve and an outlet valve to the variable interior space actuated by the electric sensor, and the outlet valve opens to a vent to the atmosphere.

All commonly-used, electrical pressure transducers or transducer systems capable of detecting correctly the amplitude and phase of vibration-induced pressure variations superimposed on a mean pressure in the interior space of the air spring over a frequency range of from about 0.5 Hz to not less than about 10 Hz frequency are suitable for the sensor in the invention. These include:

foils or crystals having piezoelectric properties which, when mounted on an elastic or solid substrate and subjected to pressure variations, provide proportionate charge or voltage variations;

bonded strain guages mounted on elastic substrates which, as differential-pressure elements subjected to the mean pressure of the interior space of the air spring on one side and the actual pressure in the interior space of the air spring on the other side, indicate voltage variations proportional to the pressure difference when a supply voltage is applied to them;

bonded strain guages mounted on elastic substrates which, when subjected to the actual pressure of the interior space of the air spring on one side and a constant pressure or vacuum on the other side, change a constant supply voltage to a different output voltage that is proportional to any variation in the pressure in interior space of the the air spring; and pressure sensors of any electrical type having a high-pass filter in the output line.

The sensor is, preferably, however, a foil having piezoelectric properties supported on a flexible or elastic sheet-like material flexibly exposed to the pressure in the interior space of the air spring only on one side. Pressure variations in the interior space of the air spring then give rise to proportionate voltages between the opposite sides of the piezoelectric foil sensor which also accurately reflect the direction or sign of the pressure variations. This sensor meets the requirements extremely well and is available at low cost, which is why it is preferred here.

Sheet-like piezoelectric materials, and especially foils, have a predominantly polycrystalline and polarized internal molecular structure. Tensile or compressive forces introduced into that structure as by flexure of a foil result in a deformation of the crystallites forming the polycrystalline structure and, hence, in a disturbance of the internal electrical equilibrium.

This disturbance can be measured between the surfaces of the sheet-like material in the form of a voltage impulse when electrically-conductive layers are applied to the surfaces, for example as vapor-deposited metal coatings. The direction of the voltage impulse depends on whether a tensile or compressive stress, in this case form a pressure increase or decrease in the interior space of the air spring, has been exerted on the sheet-like material. The amplitude of the impulse is a function of the magnitude of the deformation, and its fall time a function of the cessation of the deformation, of the electrical capacitance of the piezoelectric sensor structure, and of the magnitude of the electrical resistance of the materials between the conductive layers. Pressure variations in the interior of an air spring ranging from about 0.1 Hz to not less than about 20 Hz which reach a magnitude of at least about 0.01 bar can be correctly detected. Many vibrations introduced into the suspension system of a motor vehicle meet these criteria and, therefore, can be so detected. By the use of the air spring of the invention, therefore, they can be compensated in an unexpected, hitherto unavailable manner.

With a view to achieving good responsiveness, it has been found particularly advantageous for the piezoelectric sensor to be a foil of polyvinylidene fluoride or a copolymer thereof with opposed, electrically-conductive outer surfaces for actuating the control device. Whenever possible, the foil should have a thickness ranging from about 5 microns to about 500 microns with vapor-deposited aluminum layers on opposed, outer surfaces.

The voltage impulse generated by such a piezoelectric foil is dependent specifically on the degree of foil deformation produced by the pressure variation. For this, it has proved advantageous for the foil to bear on a layer of a resilient material on the side opposite that exposed to the interior space of the air spring. In such cases, the foil may also be sealed along its periphery to the air spring and exposed centrally thereof to its interior space.

A charge- or voltage-controlled amplifier is, preferably, connected between the drive actuating the intake and outlet valves and the piezoelectric sensor for response thereto as the control device. The control device may, optionally, also have auxiliary devices for modifying the actuation of the drive in response to the piezoelectric sensor, for example, a phase shifter and/or another amplifier.

Preferably, such auxiliary devices are responsive to auxiliary sensors, for example, one sensing the level, speed, steering- and/or braking-effort of a motor vehicle on which the air spring is used. The spring characteristics of the air spring can thus be adapted automatically to these or other operating conditions of the motor vehicle.

The intake and outlet valves may be combined into a valve block and provided with a common drive. This design meets the usual technical requirements and can be manufactured at particularly low cost.

However, significantly higher changeover frequencies can be if the intake and outlet valves are provided with separate drives. Such a design offers considerable advantages, especially with respect to the isolation characteristics secured.

In the simplest case, the valves may be digitally controlled, but this has not proved particularly satisfactory with respect to the isolation characteristics obtained. Designs amenable to proportional control are, therefore, preferred for use with the present invention.

Slow to static changes in the sprung mass, for example, those having a frequency of less than 0.1 Hz, can be detected by an electrical displacement transducer, for example a potentiometer with an output low-pass filter, and substantially compensated by responsive variation of the cross-sectional areas of the intake and outlet valves or their open times. Depending on the conditions of use, a preset level generally can be maintained in this way to deviation of not more than ±3 mm.

The principal advantage of the air spring in accordance with the invention is that it reliably provides both good isolation of high-frequency vibrations and good damping of low-frequency vibrations substantially independently of variations in the supply pressure and spring-supported mass. The air spring of the invention therefore is extremely well suited for a wide range of applications in the manufacture of vehicles, for example in wheel suspensions or in the suspension of driver's cabs and/or seats.

DETAILED DESCRIPTION OF THE INVENTION

Merely exemplary embodiments of an air spring which illustrate but do not limit the invention are shown in the accompanying drawings in which.

Figure 1:
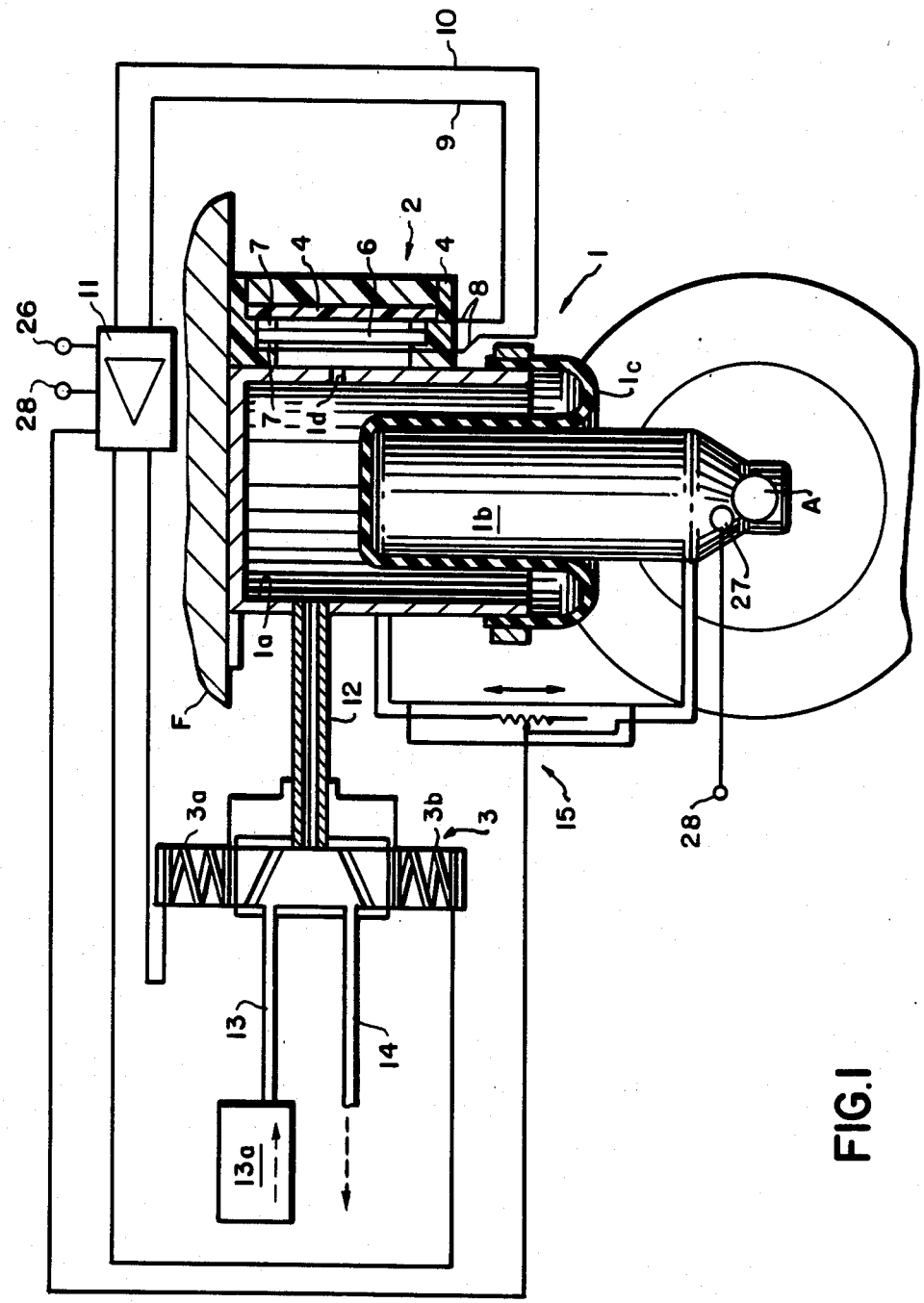
FIG. 1 is a schematic elevation, partly in section, of one preferred embodiment.

FIG. 1 shows an air spring at 1 connecting the frame F of a motor vehicle to the axle A of a wheel supporting the vehicle frame. The air spring has a hollow cylinder 1a which is closed at one, top end secured to the frame F and open at the other, bottom end for receiving a cylindrical piston 1b connected to the axle A. The hollow cylinder and piston are made axially movable relative to each other and sealed with respect to each other by a rolling diaphragm 1c therebetween. Relative axial displacement of the cylinder and piston is, therefore, not accompanied by appreciable mechanical damping.

Under operating conditions, however, the variable interior space of the air spring enclosed by the hollow cylinder, piston and rolling diaphragm is filled with air or another suitable gas or gas mixture under sufficient pressure relative to the mass of the vehicle on the frame to space the piston from the top end of the cylinder springingly. The relative, spring-acting movement of the piston and cylinder, for example when the wheel hits a bump in the road over which the vehicle is moving, then varies the gas pressure in the interior space of the air spring.

The cylinder has an opening 1d through which the pressure of the air in its interior space acts upon a control device at 2. The control device has a piezoelectric, foil sensor 6 across the opening 1d to be exposed to the air pressure on one side. For this, a two-part housing 4 made of a nonconductive plastic encloses the foil 6 on the cylinder 1a about the opening 1d. The foil 6 is made of polyvinylidene fluoride having a vapor-deposited metallic surface coating on each side. The side of the foil opposite that exposed to the pressure in the interior space of the cylinder is flexibly supported on a resilient layer 5 on the housing. The foil is circularly bounded and covered along its edge on both sides by electrically-conductive, circular rings 7 which are provided with contact pins 8. The latter are connected through electrical conductors 9 and 10 to valve-actuating magnetic coils 3a,3b of a combined intake/outlet valve at 3 via an interposed voltage amplifier 11 which matches the voltage impulses generated by foil deformation to the level required for moving the valve with the magnetic coils.

The combined intake/outlet valve 3 is provided with three gas connections. On one side, it communicates with the interior space of the cylinder through a line 12; on the other side, it communicates with a compressed-gas reservoir 13a through a supply line 13 and with the atmosphere through a vent line 14 in dependence upon the position of the valve.

An auxiliary, displacement transducer 15 indicated schematically as a potentiometer is disposed between the piston and cylinder parts of the air spring 1 and connected to the amplifier 11 to modify of the voltage therefrom for actuating the intake/outlet valve such that a constant, relative mean position of the piston and cylinder is maintained regardless of the load, the supply pressure, or the frequency of vibrations introduced.

The principle of operation of the air spring is as follows:

Starting from a mean pressure in the variable interior space of the cylinder, piston and rolling diaphragm, it will be assumed that the wheel passes over a bump in the road, thus causing compression of the air spring, i.e. relative movement of the piston and cylinder together. This reduces the volume of the interior space and, hence, produces a pressure rise in the interior space.

The pressure rise deforms piezoelectric foil 6 via the opening 1d and resilient backing 5 and the foil, therefore, releases a voltage impulse which corresponds in magnitude and direction (sign) to the pressure variation. The voltage impulse is amplified by amplifier 11 as required to actuate the outlet valve 3 to connect vent line 14 to line 12 to the interior space of the cylinder. This allows compressed air to escape from the interior space of the cylinder, thus producing a drop in the pressure in the interior space of the cylinder toward the mean pressure which is accompanied by the recovery from deformation of piezoelectric foil 6 and, hence, by the decaying of the voltage impulse and, thus, closing of the outlet valve.

If, instead, the wheel entered a pothole which caused the air spring to relax, i.e. separation of the piston and cylinder, the pressure in the interior space of the cylinder would be reduced from the mean pressure initially present. In this case, the piezoelectric foil 6 is deformed in the opposite direction, which gives rise to an oppositely directed voltage impulse. After amplification in amplifier 11, this results in actuating the valve to connect the supply line 13 to line 12 to the interior space of the cylinder, with compressed air then rushing from the reservoir 13a to the interior space of the cylinder until the original, mean pressure is restored to relieve the film deformation and, thus, close the valve.

In both cases, the mean pressure in the interior space of the cylinder is set by the auxiliary, displacement transducer 15. It sends a signal to the amplifier 11 in dependence on the spacing of the piston and cylinder to actuate the valve 3 similarly until the pressure, i.e. the mean pressure, so produced provides a predetermined spacing. The mean pressure is, therefore, a function of the load mass of the vehicle on the frame.

The auxiliary transducer 15 therefore also functions as a level transducer for the vehicle. If the frame F of the vehicle were to tilt from a load shift or braking, for example, the relative position of the cylinder 1a on the frame and piston 1b on the wheel axle A would change and the transducer 15 respond thereto to change the mean pressure to reset the preset position as before. An absolute level sensor such as a pendulum actuated potentiometer (not shown), for example, could also be used in another embodiment (not shown) for the same and further results.

FIG. 1 also shows another auxiliary transducer, a speed sensor, which is a generator 27 connected to the piston 1b and responsive to the speed of rotation of the axle A of the wheel to generate a proportionate voltage. This is supplied to terminal 28 of amplifier 11 to actuate valve 3 in relation to the speed. This allows more or less pressure response in the cylinder in proportion to vehicle speed as may be desired in the design of the vehicle suspension.

Figure 2:
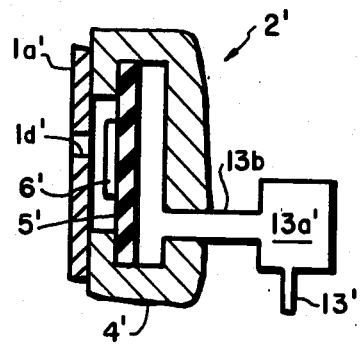
FIG. 2 is a schematic elevation, partly in section, of a portion of another preferred embodiment.

FIG. 2 shows a portion of the control device at 2' of another embodiment. In it, a housing 4' holds a resilient member 5' across the opening 1d' into the variable interior space of the cylinder 1a', as before, but in this embodiment, a strain guage 6' is on the side of the resilient element exposed to the pressure of the interior space by the opening and the other side of the resilient element is exposed to a constant or substantially constant gas pressure, in this case from the reservoir 13a' via pipe 13b. The strain guage 6' is connected to the amplifier 11 (FIG. 1) for operation as before.

Figure 3:
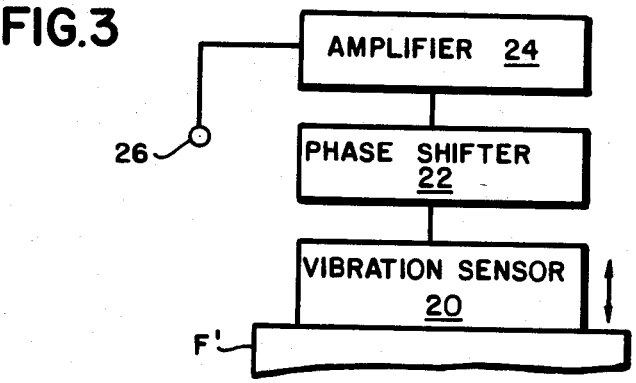
FIG. 3 is a schematic of a portion of another preferred embodiment.

FIG. 3 shows a portion of another embodiment having a vibration sensor 20, a vertical accelerometer, for example, on the frame F' of the vehicle to sense periodic vibrations as may be produced in the frame by the engine (not shown) of the vehicle, for example. The vibration sensor provides a signal corresponding to the vibrations to a phase shifter 22 which changes its phase to compensate for the phase lag in actuating the valve 3 (FIG. 1) and changing the pressure in the interior space of the cylinder 1a (FIG. 1) correspondingly. In this way, the pressure in the cylinder is changed to isolate the vibrations, i.e. reduced for compressive vibrations and vice versa as the vibrations occur. Such isolation has more utility when the air spring is used with a vehicle seat, for example, rather than the wheel shown in FIG. 1, but the principle is the same in either case. Opposite pressure compensation is possible, too, of course, and would damp vibrations as may be desired for large, slow vibrations on starting the engine, for example.

The phase-shifted vibration signals from phase shifter 11, or the other auxiliary transducers before or hereafter described, may not have the same amplitude as those from the piezoelectric or strain guage sensors 6,6' of FIGS. 1 and 2. The amplifier 11 (FIG. 1) may not, therefore, respond sufficiently or properly to the phase shifter or other auxiliary transducer signals for actuating the valve 3 properly. Accordingly another amplifier 24 is provided to adjust these signals, in this case the phase-shifted vibration signals from phase shifter 22, into correspondence with those from the other sensor 6 or 6' for amplifier 11 to actuate valve 3 properly. The signals from the amplifier are, therefore, provided to terminal 26 on amplifier 11 (FIG. 1) for its control like auxiliary transducer 15 (FIG. 1).

Figure 4:
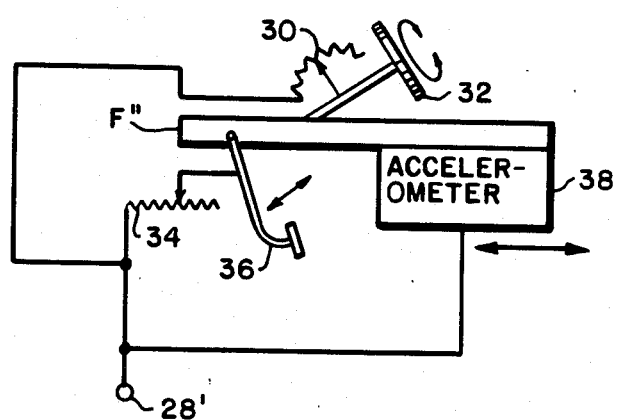
FIG. 4 is a schematic of a portion of another preferred embodiment.

FIG. 4 very schematically shows other auxiliary transducers of still another embodiment. One is a potentiometer 30 responsive to rotation of a steering wheel 32 for the vehicle (shown by frame F''). In this way, the air spring suspension of opposite front wheels of the vehicle can be changed to compensate for the dipping acceleration of turning the vehicle, for example. Braking acceleration dip can be similarly compensated for by adjusting the air spring suspension of both front wheels in response to another potentiometer auxiliary transducer 34 connected to brake pedal 36. This may also be done for engine-driven acceleration via the accelerator pedal (not shown) or both brake and accelerator accelerations may be responsive to a horizontally responsive accelerometer 38 on the vehicle frame F''. All of these auxiliary transducers are, therefore, appropriately connected to a terminal 28' on amplifier 11 (FIG. 1) for controlling the air spring suspension as desired by its design.

In these other embodiments, therefore, the amplifier 11 functions also as an auxiliary controller responsive to the height of the motor vehicle above the ground, the traveling speed of the motor vehicle, the instantaneous steering position of the motor vehicle and/or the instantaneously effective accelerative or braking forces on the motor vehicle. Apart from the level control, the specific settings of auxiliary transducers are preferably made in a test drive of the vehicle and will result in an appreciable improvement of riding comfort and driving safety.

It will be appreciated that the instant specification and claims are set forth by way of illustration and not of limitation, and that various changes and modifications may be made without departing from the spirit and scope of the present invention.

We claim:

1. An air spring for use between relatively-moving bodies comprising, in combination:

(a) means providing a variable interior space filled with a gas at a mean pressure for spring action between the bodies;
(b) a compressed - gas source;
(c) a supply line having an intake valve connecting said source to said interior space;
(d) an outlet line having an outlet valve connecting said interior space to a low pressure gas sink;
(e) a control device having an electric sensor for detecting the pressure in said interior space; and
(f) means responsive to said control device for actuating said intake and outlet valves;
wherein said control device opens said outlet valve when the pressure in said interior space exceeds said mean pressure and opens said intake valve when the pressure in said interior space falls below said mean pressure.

2. The air spring of claim 1 wherein the electric sensor is one of a piezoelectric foil and an elastically-supported strain guage.

3. The air spring of claim 2, wherein the control device further comprises one of a charge and voltage amplifier responsive to the electric sensor for actuating the drive means.

4. The air spring of claim 1, wherein the control device further comprises one of a charge and voltage amplifier responsive to the electric sensor for actuating the drive means.

5. The air spring of claim 4, wherein the electric sensor comprises a piezoelectric foil of one of polyvinylidene fluoride and a copolymer thereof exposed to the interior space only on one side and having electrically-conductive means on opposed outer surfaces thereof for electrical connection-thereto.

6. The air spring of claim 5 wherein the other side of the foil bears against a resilient material.

7. The air spring of claim 6, wherein the foil has a thickness between the conductive surfaces of from about 10 microns to about 300 microns.

8. The air spring of claim 4, wherein the control device further comprises auxiliary means comprising an auxiliary transducer for producing a valve-actuating response from the amplifier.

9. The air spring of claim 8 wherein the auxiliary means further comprises at least one of a phase shifter and amplifier.

10. The air spring of claim 9, wherein the electric sensor comprises a piezoelectric foil of one of polyvinylidene fluoride and a copolymer thereof exposed to the interior space only on one side and having electrically-conductive means on opposed outer surfaces thereof for electrical connection-thereto.

11. The air spring of claim 8 wherein the auxiliary transducer comprises at least one of a level, speed, steering, braking, and acceleration transducer.

12. The air spring of claim 11, wherein the electric sensor comprises a piezoelectric foil of one of polyvinylidene fluoride and a copolymer thereof exposed to the interior space only on one side and having electrically-conductive means on opposed outer surfaces thereof for electrical connection-thereto.

13. The air spring of claim 8, wherein the electric sensor comprises a piezoelectric foil of one of polyvinylidene fluoride and a copolymer thereof exposed to the interior space only on one side and having electrically-conductive means on opposed outer surfaces thereof for electrical connection-thereto.

14. The air spring of claim 13 wherein the other side of the foil bears against a resilient material.

15. The air spring of claim 14, wherein the foil has a thickness between the conductive surfaces of from about 10 microns to about 300 microns.

16. The air spring of claim 1, wherein the electric sensor comprises a piezoelectric foil of one of polyvinylidene fluoride and a copolymer thereof exposed to the interior space only on one side and having electrically-conductive means on opposed outer surfaces thereof for electrical connection-thereto.

17. The air spring of claim 16, wherein the foil has a thickness between the conductive surfaces of from about 10 microns to about 300 microns.

18. The air spring of claim 16 wherein the other side of the foil bears against a resilient material.

19. The air spring of claim 18, wherein the foil has a thickness between the conductive surfaces of from about 10 microns to about 300 microns.

20. The air spring of claim 1, wherein said gas sink is the atmosphere.

* * * * *